(12) United States Patent
Jiang

(10) Patent No.: US 7,512,112 B2
(45) Date of Patent: Mar. 31, 2009

(54) METHOD AND APPARATUS OF CONTROLLING A RESET PROCEDURE IN A WIRELESS COMMUNICATION SYSTEM

(75) Inventor: Sam Shiaw-Shiang Jiang, Hsin-Chu (TW)

(73) Assignee: Innovative Sonic Limited, Tortola (VG)

( * ) Notice: Subject to any disclaimer, the term of this patent is extended or adjusted under 35 U.S.C. 154(b) by 718 days.

(21) Appl. No.: 10/709,789

(22) Filed: May 28, 2004

(65) Prior Publication Data
US 2005/0036477 A1 Feb. 17, 2005

Related U.S. Application Data

(60) Provisional application No. 60/495,106, filed on Aug. 15, 2003.

(51) Int. Cl.
*H04J 3/06* (2006.01)
(52) U.S. Cl. .................................... 370/350
(58) Field of Classification Search ............... None
See application file for complete search history.

(56) References Cited

U.S. PATENT DOCUMENTS

| 2003/0007459 A1* | 1/2003 | Yi et al. ................. 370/252 |
| 2003/0092458 A1 | 5/2003 | Kuo |
| 2004/0148396 A1* | 7/2004 | Meyer et al. ............. 709/227 |
| 2004/0148546 A1* | 7/2004 | Meyer et al. ............. 714/18 |

* cited by examiner

*Primary Examiner*—Charles N Appiah
*Assistant Examiner*—Jaime M Holliday
(74) *Attorney, Agent, or Firm*—Winston Hsu

(57) ABSTRACT

A method of controlling a reset procedure sets a proper clocked period to the timer Timer_Status_Prohibit for blocking the timer Timer_Status_Period from interfering with the counting of the state variable VT(RST). In addition, the method of controlling a reset procedure makes use of an amended triggering condition. Therefore, the sender ignores the STATUS PDUs when the reset procedure is ongoing. To sum up, the state variable VT(RST) is not incremented abnormally, and the reset procedure behaves correctly according to the configured protocol parameter MaxRST.

8 Claims, 9 Drawing Sheets

US 7,512,112 B2

METHOD AND APPARATUS OF CONTROLLING A RESET PROCEDURE IN A WIRELESS COMMUNICATION SYSTEM

CROSS REFERENCE TO RELATED APPLICATIONS

The application claims the benefit of U.S. Provisional Application No. 60/495,106, which was filed on Aug. 15, 2003 and entitled "Triggering condition of RLC Reset Procedure in Wireless Communication Systems".

BACKGROUND OF INVENTION

1. Field of the Invention

The present invention relates to a method of driving a wireless communications system to trigger a reset procedure, and more specifically, to a method and an apparatus of controlling a reset procedure in a wireless communications system.

2. Description of the Prior Art

Many communications protocols typically utilize a three-layered approach to communications. Please refer to FIG. 1, which is a block diagram of the three layers in such a prior art communications protocol. In a typical wireless environment, a first station 10 is in wireless communications with one or more second stations 30. An application 13 on the first station 10 composes a message 11 and has it delivered to the second station 20 by handing the message 11 to a layer 3 interface 12. The layer 3 interface 12 then delivers the message 11 to a layer 2 interface 16 in the form of layer 2 service data units (SDUs) 14. The layer 2 SDUs 14 may be of any length. The layer 2 interface 16 comprises a radio link control (RLC) layer 18 on top of a medium access control (MAC) layer 20, and in communications with the medium access control layer 20. The RLC layer 18 supports many functions such as the flow control, the sequence number check, and the ciphering. The MAC layer 20 acts as an interface between the RLC layer 18 and the layer 1 interface 22. From an upper-layer perspective (the RLC layer 18 and higher layers), many channels may be established. Functionally, however, these channels must be consolidated into a single stream for presentation to the layer 1 interface 22. This is one of the main purposes of the MAC layer 20. Therefore, the MAC layer 20 outputs the PDUs arranged in a single stream to the layer 1 interface 22. In other words, the layer 2 interface 16 composes the SDUs 14 into one or more layer 2 protocol data units (PDUs) 24. Each layer 2 PDU 24 is of a fixed length, and is delivered to the layer 1 interface 22.

The layer 1 interface 22 is the physical layer used for transmitting data to the second station 30. The transmitted data is received by the layer 1 interface 42 of the second station 30 and reconstructed into one or more PDUs 44, which are passed up to the layer 2 interface 36. The layer 2 interface 36 also includes a RLC layer 38 and a MAC layer 40. The MAC layer 40 receives the incoming PDUs 44, and dispatches these PDUs 44 to each channels. The RLC layer 38 then assembles one or more layer 2 SDUs 34 according to the PDUs 44 dispatched from the MAC layer 40. Then, the layer 2 SDUs 34 are passed up to the layer 3 interface 32. The layer 3 interface 32, in turn, converts the layer 2 SDUs 34 back into a message 31, which should be identical to the original message 11 that was generated by the application 13 on the first station 10. In the end, the received message 31 is passed to an application 33 on the second station 30.

In a noisy environment of wireless transmissions, a receiver, such as a base station or a mobile unit, often misses data. That is, some layer 2 PDUs 24 will therefore be missing. Thus, wireless protocols are carefully designed to address such problems. It is well-known that each PDU has a specific sequence number, and the PDUs are sequentially numbered. The RLC layers 18, 38 are capable of utilizing the sequence numbers of the PDUs to detect if one PDU is erroneously transmitted or received. As specified in the 3GPP TS 25.322 V4.9.0 (2003-6) Radio Link Control (RLC) protocol specification, a sender enables a polling function to request a peer receiver for a status report. In other words, the receiver transmits status reports to the corresponding sender to inform the sender about which PDUs have been received and not received. Each status report consists of one or several STATUS PDUs. Please note that the status report can also be carried by piggybacked STATUS PDUs embedded within DATA PDUs.

Furthermore, if the receiver detects one or several missing PDUs, it can trigger the transmission of a status report to the sender. In addition, the receiver can also trigger the transmission of a status report to the sender when a timer Timer_Status_Periodic expires. In other words, the receiver is capable of triggering the transmission of a status report to the sender periodically. Both the STATUS PDU and the Piggybacked STATUS PDU have a similar data structure, and they include a plurality of super fields (SUFIs). The SUFIs contain useful sequence number (SN) information used by the sender to determine if the receiver correctly receives the PDUs outputted from the sender. For example, the LIST, BITMAP or RLIST SUFIs can be used to indicate negatively acknowledged sequence numbers. ACK SUFI with a LSN field can be used to indicate that SN<=LSN 1 is positively acknowledged unless this SN is negatively acknowledged in the same STATUS PDU or Piggybacked STATUS PDU.

In addition, both the receiver and the sender have windows within which they expect to receive the PDUs and transmit the PDUs. The sender has a transmitting window that is delimited by two state variables: VT(A) and VT(MS). VT(A) marks the beginning of the transmitting window, and VT(MS) marks the end of the transmitting window. The sender will only transmit PDUs that have sequence numbers within the range of the transmitting window, i.e., that are sequentially on or after VT(A), and are sequentially before VT(MS). The sender has an additional state variable VT(S). When the sender begins transmitting the PDUs that lie within the transmitting window, the sender begins with a PDU having a sequence number given by the state variable VT(A), and works sequentially forward until it reaches a PDU having a sequence number that is just prior to VT(MS). That is, the sender transmits the PDUs in sequence, beginning at VT(A) and ending at VT(MS)1. The state variable VT(S) holds the sequence number of the next new PDU to be transmitted. Thus, the PDUs with sequence numbers on or sequentially before VT(S)-1 have been transmitted at least one time.

Therefore, PDUs with sequence numbers on or after VT(S) have not yet been transmitted by the sender. Suppose that the sender receives a STATUS PDU from the peer receiver, and reads a LIST, BITMAP or RLIST SUFI within the STATUS PDU. When a negatively acknowledged sequence number indicated by the LIST, BITMAP or RLIST SUFI is outside an interval delimited by VT(A) and VT(S)-1, the STATUS PDU is regarded to include an erroneous sequence number. In addition, when the value of the LSN field in an ACK SUFI is outside an interval delimited by VT(A) and VT(S), the STATUS PDU is also regarded to include an erroneous sequence number. Based on the prior art RLC specification, the sender discards the STATUS PDU or the Piggybacked STATUS PDU including the erroneous sequence number, and outputs a RESET PDU to the receiver for activating a corresponding reset procedure.

Please refer to FIG. 2, which is a first timing diagram illustrating the prior art reset procedure. In FIG. 2, the transmission delay between the sender and the receiver is neglected for simplicity. The state variable VT(RST) is used to count the number of times for the RESET PDUs outputted from the sender to the receiver before the reset procedure is completed. VT(RST) functions as a count value, and is increased by 1 each time a RESET PDU is scheduled to be transferred, and is reset when the sender receives a RESET ACK PDU from the receiver. In addition, an initial value of the VT(RST) is equal to 0. A protocol parameter MaxRST stands for an upper threshold of the VT(RST). If VT(RST) equals MaxRST, the sender informs upper layers about an unrecoverable error to release the radio bearer. That is, the maximum number of transmissions of the transmitted RESET PDU is equal to MaxRST-1. Two timers Timer_Status_Periodic and Timer_RST are involved in the reset procedure. The timer Timer_RST is started when a RESET PDU is transferred from the sender to the receiver. However, if the timer Timer_RST expires, the RESET PDU is transmitted again to the receiver. Concerning another timer Timer_Status_Periodic, it is used to trigger the receiver to deliver status reports to the sender periodically. Therefore, if the timer Timer_Status_Periodic expires, the receiver outputs a status report containing STATUS PDUs to the sender, and the timer Timer_Status_Periodic is restarted. As shown in FIG. 2, the state variable VT(RST) stores the initial value equaling 0 before the reset procedure is activated. In addition, the timer Timer_Status_Periodic is started when the receiver is successfully configured for receiving PDUs. Therefore, the timer Timer_Status_Periodic starts working before the reset procedure is activated.

Suppose that the timer Timer_RST is used to count a clocked period equal to 100 ms, and the protocol parameter MaxRST is set to 4. At $t_0$, the receiver is triggered to output a status report to the sender. However, because of protocol error or transmission error, the sender receives this STATUS PDU at $t_0$ and decides that the STATUS PDU contains an erroneous sequence number. Therefore, the sender outputs a RESET PDU to the receiver for activating the reset procedure, and waits for the RESET ACK PDU delivered from the receiver. The timer Timer_RST is started to count the clocked period (100 ms). In addition, the state variable VT(RST) is incremented by 1, and stores 1 at $t_0$.

At $t_0+100$, the timer Timer_RST expires and the wanted RESET ACK PDU is not received. Therefore, the sender retransmits the RESET PDU to the receiver, and continues waiting for the wanted RESET ACK PDU. The state variable VT(RST) is further increased by 1, and keeps 2 at $t_0+100$. Similarly, the timer Timer_RST will expire at $t_0+200$. Suppose that the wanted RESET ACK PDU is not received still. Then, the sender retransmits the RESET PDU to the receiver, and continues waiting for the wanted RESET ACK PDU. The state variable VT(RST) is further increased by 1, and keeps 3 at $t_0+200$.

Please note that the timer Timer_Status_Periodic expires at T' that is between $t_0+200$ and $t_0+300$. Therefore, the receiver is triggered to output a status report to the sender with the same content as the previous STATUS PDU. Again, the sender receives the STATUS PDU and decides it contains an erroneous sequence number at T'. When the RESET PDU is scheduled to be transferred at T', the state variable VT(RST) is increased by 1, and stores 4 at T'. At this time, the state variable VT(RST) stores a value equaling the protocol parameter MaxRST. Therefore, the sender indicates an unrecoverable error to the upper layers at T', and the radio bearer is accordingly released.

Because the protocol parameter MaxRST is set to 4, the sender gives the receiver 3 chances to respond a RESET ACK PDU. In other words, the sender originally permits the receiver to respond within 300 ms. If the receiver can respond the RESET ACK PDU before $t_0+300$, the sender will be able to restart data transmission between the sender and the receiver after resetting protocol parameters. However, the timer Timer_Status_Periodic triggers the receiver to respond the periodic status report before $t_0+300$, and the reset procedure is terminated at T'. It is possible that the receiver responds the RESET ACK PDU at T" between T' and $t_0+300$. However, the sender cannot restart data transmission between the sender and the receiver because an unrecoverable error has been indicated to the upper layers at T' and the radio bearer will be released according to the prior art reset procedure. That is, the operation of the timer Timer_Status_Periodic impedes the functionality of the defined protocol parameter MaxRST.

Please refer to FIG. 3, which is a second timing diagram illustrating the prior art reset procedure. Same as FIG. 2, the transmission delay between the sender and the receiver is neglected in FIG. 3 for simplicity. Suppose that the timer Timer_RST is used to count a clocked period equal to 700 ms, timer Timer_Status_Period is used to count a clocked period equal to 100 ms, and the protocol parameter MaxRST is set to 4. At $t_0$, the timer Timer_Status_Period expires, and the receiver is triggered to output a status report to inform the sender of the PDU receiving status. Suppose that the sender receives this status report at $t_0$ and finds it contains an erroneous sequence number. Therefore, the sender outputs a RESET PDU to the receiver at $t_0$ for activating the reset procedure, and waits for the RESET ACK PDU delivered from the receiver. The timer Timer_RST is started to count the clocked period (700 ms), and the state variable VT(RST) is incremented by 1 to store 1. At $t_0+100$, the timer Timer_Status_Period expires. The receiver sends a status report to the sender with the same content of the previous status report since there is no data PDUs sent by the sender during this period. The sender determines there is an erroneous sequence number in the status report again. Therefore, the sender retransmits the RESET PDU to the receiver, and continues waiting for the wanted RESET ACK PDU. The state variable VT(RST) is further increased by 1, and keeps 2 at $t_0+100$. Similarly, the timer Timer_Status_Periodic will expire at $t_0+200$. The receiver sends a status report, which is considered as containing an erroneous sequence number again by the sender. Thus, the sender retransmits the RESET PDU to the receiver, and continues waiting for the wanted RESET ACK PDU. The state variable VT(RST) is further increased by 1, and keeps 3 at $t_0+200$.

Similarly, the timer Timer_Status_Periodic expires at $t_0+300$. Again, the receiver is triggered to output a status report with exactly the same content as before. Therefore, the sender receives the status report and determines that it includes an erroneous sequence number at $t_0+300$. When the RESET PDU is scheduled to be transferred at $t_0+300$, the state variable VT(RST) is increased by 1, and stores 4 at $t_0+300$. At this time, the state variable VT(RST) stores a value equaling the protocol parameter MaxRST. Therefore, the sender indicates an unrecoverable error to the upper layers at $t_0+300$, and the radio bearer is accordingly released. Please note that the sender originally permits the receiver to respond the RESET ACK PDU within 3*700 ms. If the receiver can respond the RESET ACK PDU before $t_0+$'*700 ms, the sender will be able to restart data transmission between the sender and the receiver. However, the timer Timer_Status_Periodic triggers the receiver to respond the unexpected status reports, and an unrecoverable error is indicated to the upper layers earlier than the expected $t_0+$'*700 at the sender. It is possible that the receiver responds the RESET ACK PDU after $t_0+300$. However, an unrecoverable error has been reported to upper layers prematurely to release the radio bearer according to the prior art reset procedure. That is, the operation of the timer Timer_Status_Periodic impedes the correct functionality of the defined protocol parameter MaxRST.

SUMMARY OF INVENTION

It is therefore a primary objective of the claimed invention to provide a method and an apparatus of controlling a reset procedure in a wireless communications system for canceling interference introduced by unexpected STATUS PDUs during the ongoing reset procedure.

The present invention discloses a method of controlling a reset procedure for a radio communication link between a sender and a receiver comprising the steps of: (a) the receiver transmitting at least a receiving status report to the sender; (b) blocking the receiver from outputting another receiving status report to the sender for a first predetermined period of time, called P1 hereafter; (c) the sender receiving at least one receiving status report sent from the receiver, determining that the receiving status report contains protocol error, transmitting a RESET PDU to the receiver, and starting a first timer for clocking a second predetermined period of time, called P2 hereafter; (d) before the number of transmissions of the RESET PDUs reaches a predetermined value, called M hereafter, the sender outputting a RESET PDU to the receiver each time the first timer expires; and (e) when the number of transmissions of the RESET PDUs reaches M and either the first timer expires or a RESET PDU is triggered to transmit by step (c), the sender detecting an unrecoverable protocol error; wherein P1 in step (b) is not less than the result of P2 multiplied by M.

The claimed invention further discloses a method of controlling a reset procedure for a radio communication link between a sender and a receiver comprising the steps of: (a) the receiver transmitting at least a receiving status report to the sender; (b) the sender receiving at least a first receiving status report sent from the receiver, determining that the receiving status report contains protocol error, activating a reset procedure, and transmitting a RESET PDU to the receiver; and (c) recognizing the reset procedure as ongoing before the sender receives a RESET ACK PDU outputted from the receiver; wherein step (c) further comprises controlling the sender to ignore at least a second receiving status report outputted from the receiver when the reset procedure is ongoing, wherein the second receiving status report is received later than the first receiving status report.

In addition, a receiver in wireless communication with a sender for transmitting at least a receiving status report is disclosed. The sender receives at least the receiving status report, transmits a RESET PDU to the receiver and starts a first timer for clocking a first predetermined period of time, called P1 hereafter, when determining that the receiving status report contains protocol error, stores a predetermined value, called M hereafter and counts the number of transmissions of the RESET PDUs, wherein before the number of transmissions of the RESET PDUs reaches M, the sender outputs a RESET PDU to the receiver each time the first timer expires, and the sender detects an unrecoverable protocol error when the number of transmissions of the RESET PDUs reaches M and either the first timer expires or a RESET PDU is triggered to transmit. The claimed receiver comprises a communication interface for blocking the receiver from outputting another receiving status report for a second predetermined period of time, called P2 hereafter, wherein P2 is not less than the result of P1 multiplied by M.

According to one preferred embodiment, a sender in wireless communication with a receiver for receiving at least a first receiving status report sent from the receiver is disclosed. The claimed sender comprises a communication interface for activating a reset procedure and transmitting a RESET PDU to the receiver when determining that the first receiving status report contains protocol error; and a decision logic electrically connected to the communication interface for recognizing the reset procedure as ongoing before the communication interface receives a RESET ACK PDU outputted from the receiver, wherein the decision logic controls the communication interface to ignore at least a second receiving status report outputted from the receiver when the reset procedure is ongoing. The second receiving status report is received later than the first receiving status report.

Briefly summarized, the claimed method of controlling a reset procedure sets a proper clocked period to the timer Timer_Status_Prohibit for blocking the timer Timer_Status_Period from interfering with the counting of the state variable VT(RST). In addition, the claimed method of controlling a reset procedure makes use of an amended triggering condition. Therefore, the sender ignores the STATUS PDUs when the reset procedure is ongoing. To sum up, the state variable VT(RST) is not computed abnormally, and the reset procedure behaves correctly according to the configured protocol parameter MaxRST, which is equal to M+1 where M is the predetermined value described above.

These and other objectives of the claimed invention will no doubt become obvious to those of ordinary skill in the art at reading the following detailed description of the preferred embodiments that are illustrated in the various figures and drawings.

DETAILED DESCRIPTION

Figure 1:
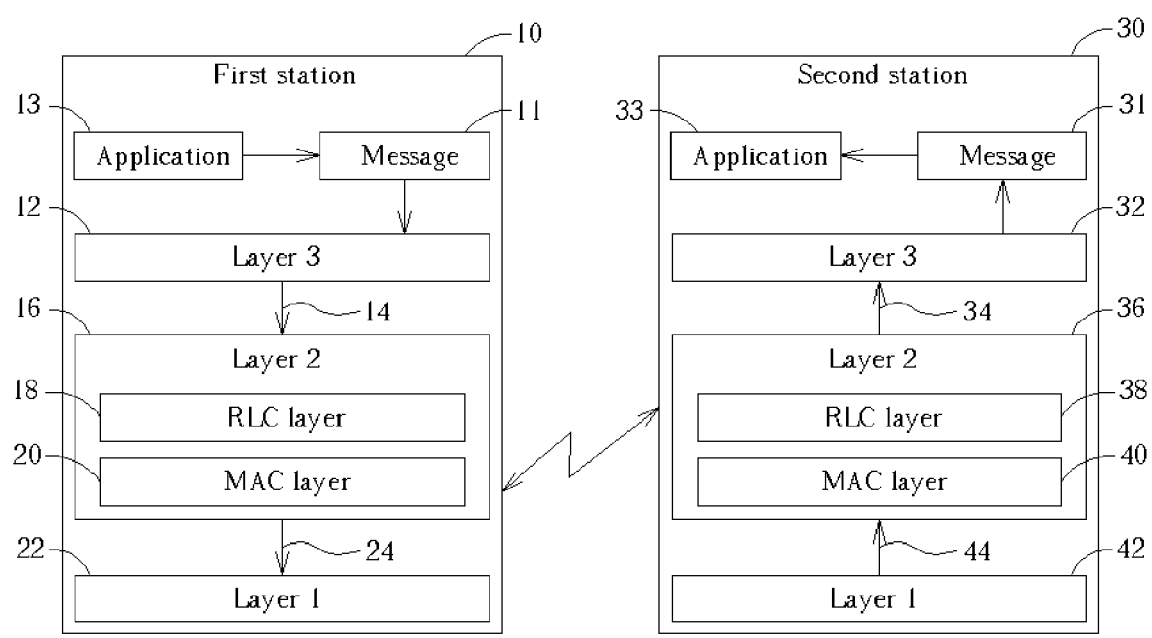
FIG. 1 is a block diagram of the three layers in such a prior art communications protocol.

As a first embodiment of the preferred embodiments, the duration of a timer Timer_Status_Prohibit is configured properly to block the timer Time_Status_Periodic from impeding the defined protocol parameter MaxRST. The usage of the timer Timer_Status_Prohibit is explained as follows. Please refer to FIG. 4, which is a first timing diagram illustrating the abnormal case handling for a reset procedure according to a first embodiment of the present invention. After the timer Timer_Status_Prohibit is started, the transmission of the triggered status reports is delayed until the timer Timer_Status_Prohibit expires. Suppose that the timer Timer_RST is used to count a clocked period equal to 100 ms, and the protocol parameter MaxRST is set to 4. In this first preferred embodiment, the duration of the timer Timer_Status_Prohibit is set to a value that is not less than a product of MaxRST-1 and the clocked period of the timer Timer_RST. For example, the period counted by the timer Timer_Status_Prohibit in the first preferred embodiment is set to 350 ms.

The timer Timer_Status_Periodic works before the reset procedure is activated. At $t_0$, the receiver detects missing PDUs and outputs a status report to the sender. Because of protocol error or transmission error, the sender receives the STATUS PDU and decides that the STATUS PDU contains an erroneous sequence number at $t_0$. As before, the transmission delay between the sender and the receiver is neglected in FIG. 4 for simplicity. Then, the sender outputs a RESET PDU to the receiver for activating the reset procedure, and waits for the RESET ACK PDU delivered from the receiver. The timer Timer_RST is started to count the clocked period (100 ms). In addition, the state variable VT(RST) is reset by an initial value before the sender receives the STATUS REPORT, and is incremented by 1, and stores 1 at $t_0$. Please note that the timer Timer_Status_Prohibit is enabled to count its clocked period (350 ms) when the receiver outputs the STATUS PDU to the sender. The timer Timer_Status_Periodic counts normally.

At $t_0$+100, the timer Timer_RST expires. Therefore, the sender retransmits the RESET PDU to the receiver, and continues waiting for the wanted RESET ACK PDU. The state variable VT(RST) is further increased by 1, and keeps 2 at $t_0$+100. Similarly, the timer Timer_RST expires at $t_0$+200. Then, the sender retransmits the RESET PDU to the receiver, and continues waiting for the wanted RESET ACK PDU. The state variable VT(RST) is further increased by 1, and keeps 3 at $t_0$+200.

In the receiver side, at T', the timer Timer_Status_Periodic expires. A status report is triggered. However, since the timer Timer_Status_Prohibit has been started, the triggered status report is delayed. No status report is sent out by the receiver at T'.

Figure 2:
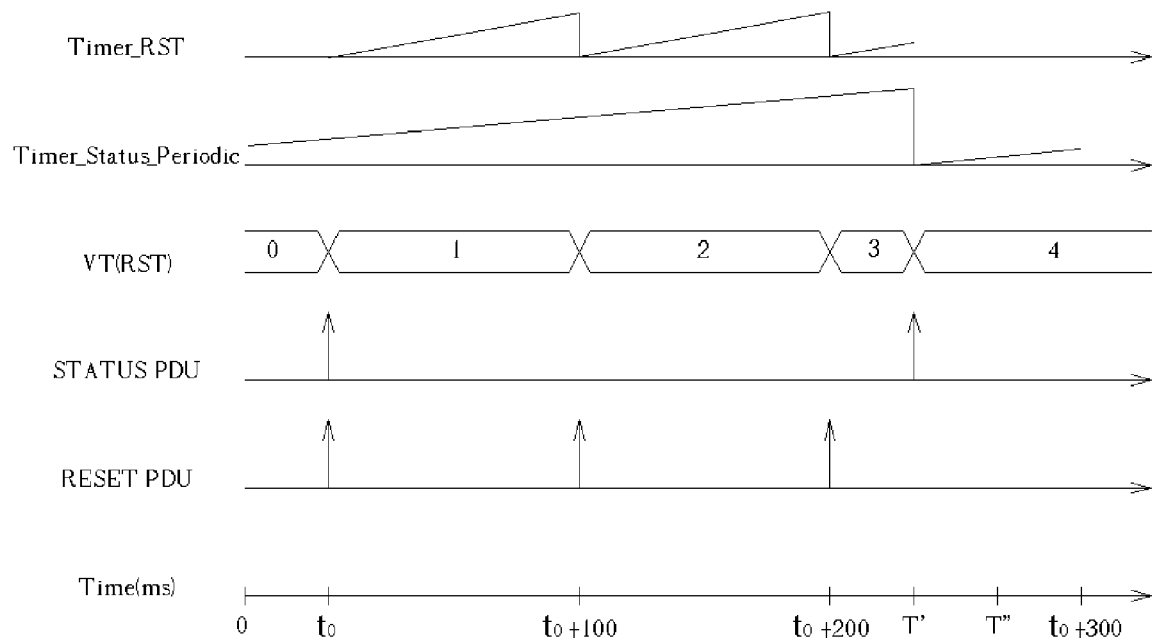
FIG. 2 is a first timing diagram illustrating the prior art reset procedure.
Figure 4:
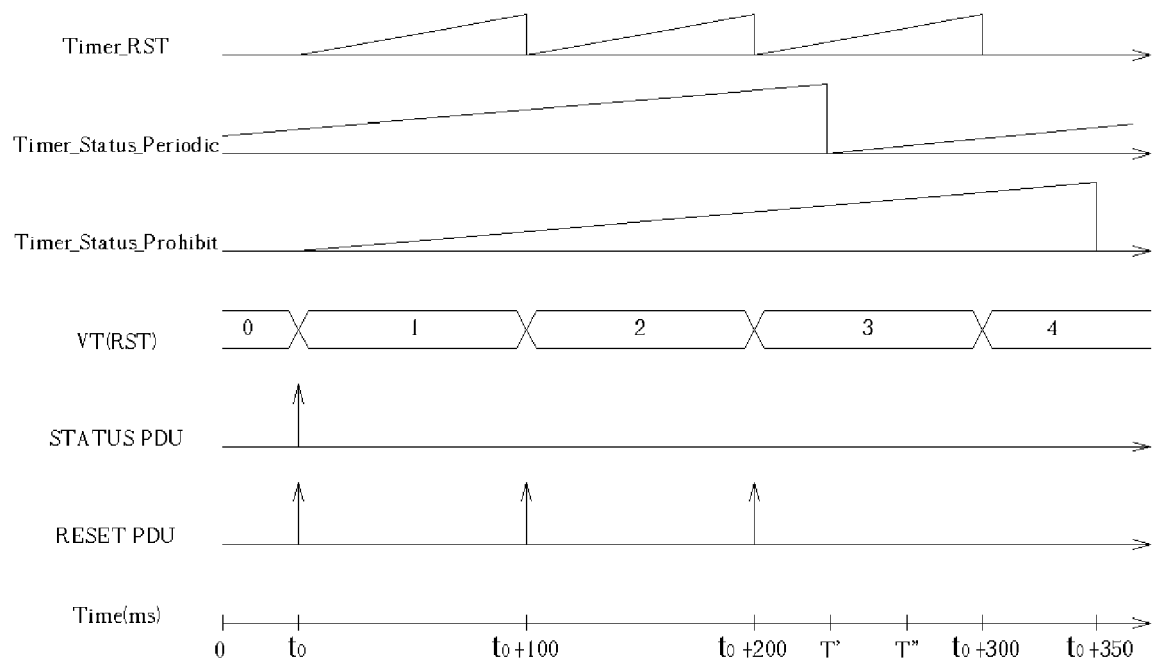
FIG. 4 is a first timing diagram illustrating a reset procedure according to a first embodiment of the present invention.

Next, the timer Timer_RST expires at $t_0$+300. When the RESET PDU is scheduled to be transferred at $t_0$+300, the state variable VT(RST) is increased by 1, and stores 4. At this time, the state variable VT(RST) stores a value equaling the protocol parameter MaxRST. Therefore, the sender indicates an unrecoverable error to the upper layers, and the radio bearer is accordingly released. Because the protocol parameter MaxRST is set to 4, the sender gives the receiver 3 chances to receive the RESET PDU and accordingly to respond a RESET ACK PDU. Please note that the clocked period of the timer Timer_Status_Prohibit is not less that 300 ms. In other words, the protocol parameter MaxRST functions normally to make the sender capable of permitting the receiver to respond with a RESET ACK PDU within 300 ms after the STATUS PDU found to contain erroneous sequence number for the first time. Suppose that the receiver responds a RESET ACK PDU at T" between T' and $t_0$+300, the sender can reset its protocol parameters and restart data transmission between the sender and the receiver. Note that, since we neglect the transmission delay in the drawings for easy to understand, the round-way transmission delay shall be considered in setting the actual duration of the timer Timer_Status_Prohibit. As shown in FIG. 4, the timer Timer_Status_Prohibit expires at $t_0$+350. In other words, the delayed status report triggered by expiration of the timer Timer_Status_Periodic at T' can only be sent at $t_0$+350, which will not impede the MaxRST functionality now. Compared with the prior art reset procedure shown in FIG. 2, the claimed reset procedure shown in FIG. 4 is not terminated prematurely. That is, the sender really gives the receiver enough chances to receive and enough time to respond to the RESET PDU. With the help of the adequately configured duration of the timer Timer_Status_Prohibit, the operation of the timer Timer_Status_Periodic does not impede the functionality of the defined protocol parameter MaxRST.

Figure 5:
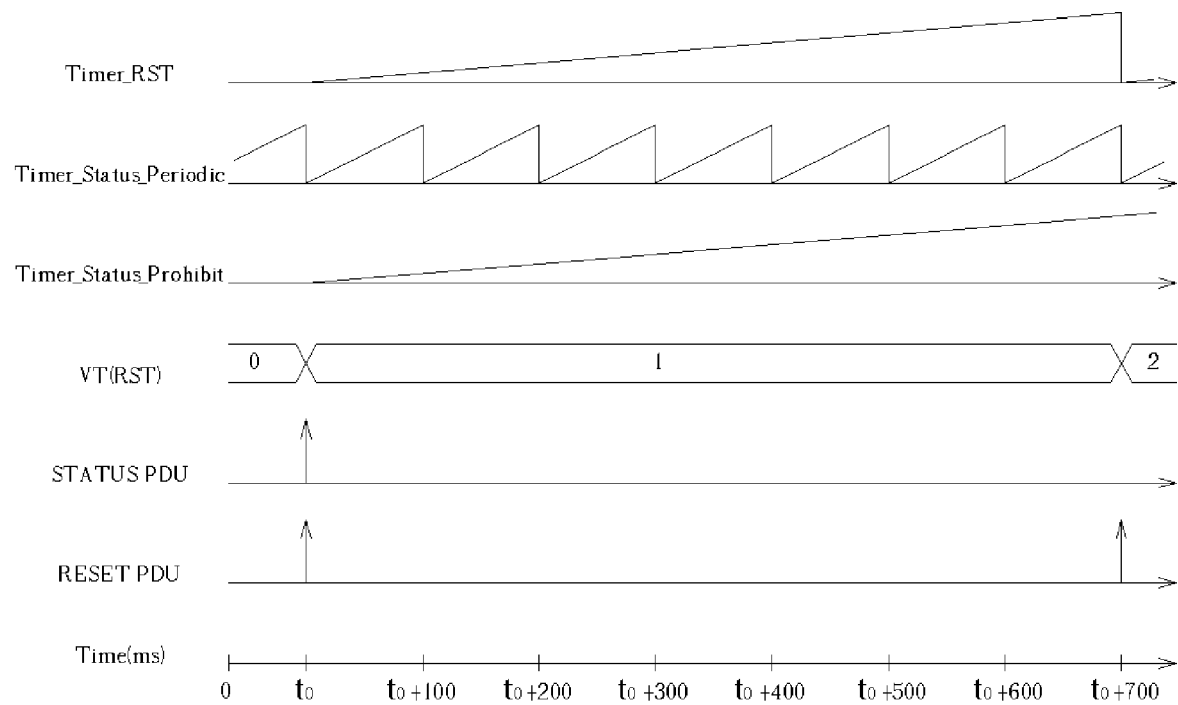
FIG. 5 is a second timing diagram illustrating a reset procedure according to the first embodiment of the present invention.

Please refer to FIG. 5, which is a second timing diagram illustrating the abnormal case handling for a reset procedure according to the first embodiment of the present invention. Suppose that the timer Timer_RST is used to count a clocked period equal to 700 ms, timer Timer_Status_Period is used to count a clocked period equal to 100 ms, and the protocol parameter MaxRST is set to 4. As mentioned above, the duration of the timer Timer_Status_Prohibit, in the first preferred embodiment, is set to a value that is not less than a product of MaxRST-1 and the clocked period of the timer Timer_RST. For example, the duration of the timer Timer_Status_Prohibit in the first preferred embodiment is set to 2500 ms.

At $t_0$, the timer Timer_Status_Period expires, and the receiver is triggered to output a status report to inform the sender of any missing and receiving PDUs. Suppose that the sender receives this status report and determines that the status report contains an erroneous sequence number at $t_0$. Please note that the timer Timer_Status_Prohibit is started to count its clocked period, e.g., 2500 ms, when the receiver outputs the last STATUS PDU of the status report to the sender. If there is any further status report trigger, for example by the expiration of the timer Timer_Status_Periodic, after $T_0$, the status report will be delayed until the timer Timer_Status_Prohibit expires. In the meantime, the sender outputs a RESET PDU to the receiver for activating the reset procedure at $t_0$, and waits for the RESET ACK PDU delivered from the receiver. The timer Timer_RST is started to count the clocked period (700 ms), and the state variable VT(RST) is incremented by 1 to store 1.

Because the timer Timer_Status_Prohibit is started, the receiver will not output further status report when the timer Timer_Status_Periodic expires at $t_0$+100, $t_0$+200, $t_0$+300, etc., until the timer Timer_Status_Prohibit expires. Therefore, if the RESET PDU is missing and not received by the receiver, the timer Timer_RST can successfully expire at $t_0$+700. At this time, the sender retransmits the RESET PDU to the receiver, and waits for the RESET ACK PDU delivered from the receiver. In addition, the state variable VT(RST) is incremented by 1 to store 2, and the timer Timer_RST restarts at $t_0$+700.

Figure 3:
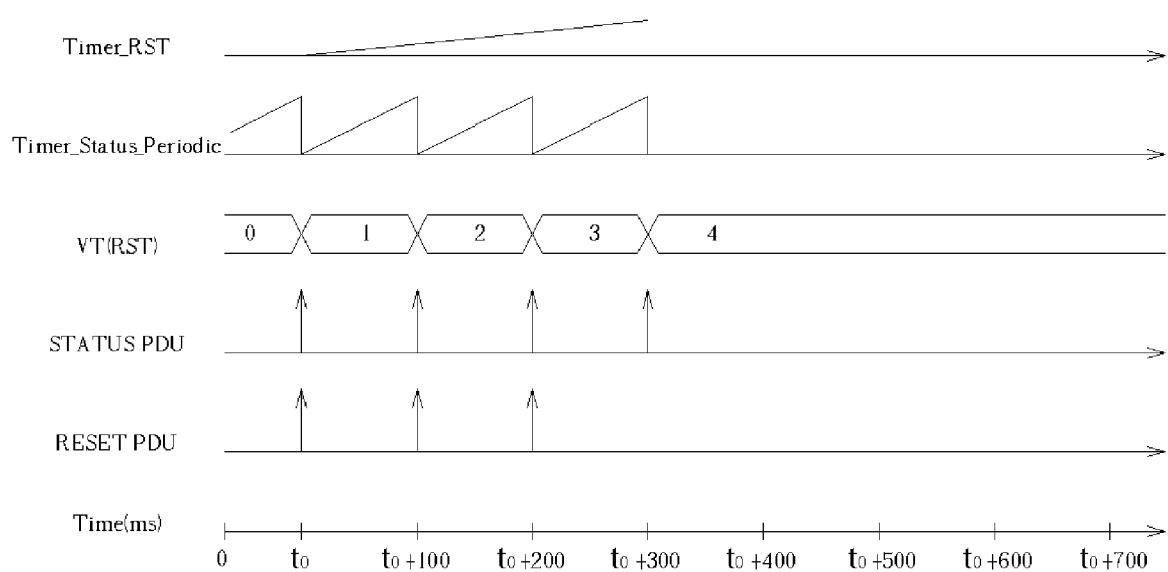
FIG. 3 is a second timing diagram illustrating the prior art reset procedure.

According to the above-mentioned operations, when the state variable VT(RST) stores a value equaling the protocol parameter MaxRST, the sender indicates an unrecoverable error to the upper layers, and the radio bearer is released. Because the protocol parameter MaxRST is set to 4, the sender gives the receiver 3 chances to receive the RESET PDU and to correspondingly respond a RESET ACK PDU. Please note that the clocked period of the timer Timer_Status_Prohibit is not less that 2100 ms. In other words, the protocol parameter MaxRST functions normally to make the sender capable of permitting the receiver three times for receiving the RESET PDU and to respond within 2100 ms in total. If the receiver can respond the RESET ACK PDU before $t_0+2100$, the sender can recover the protocol error indicated by the erroneous sequence number in a status report by reset its protocol parameters and can restart data transmission between the sender and the receiver. As mentioned above, the timer Timer_Status_Prohibit will expire at $t_0+2500$, and the receiver stop blocking status reports previously triggered by the timer Timer_Status_Periodic. For the case that an unrecoverable protocol error is reported to upper layers by the sender, the delayed status reports is useless since this radio bearer will be released because of unrecoverable protocol error. However, for the case that there is no erroneous sequence number in the first STATUS report, the delayed status report maintains the status reporting mechanism normal. Compared with the prior art reset procedure shown in FIG. 3, the claimed reset procedure shown in FIG. 5 is not terminated prematurely. That is, the sender really gives the receiver enough chances to receive and enough time to respond to the RESET PDU. With the help of the adequately configured duration of the timer Timer_Status_Prohibit, the operation of the timer Timer_Status_Periodic does not impede the functionality of the defined protocol parameter MaxRST.

Figure 6:
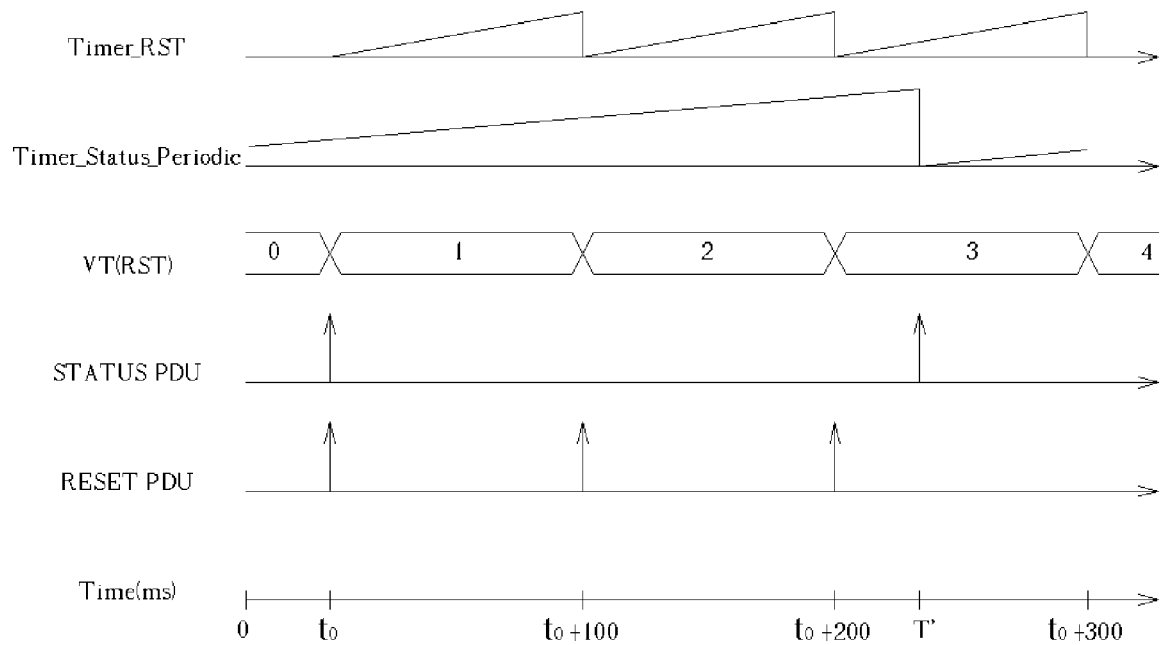
FIG. 6 is a first timing diagram illustrating a reset procedure according to a second embodiment of the present invention.

As a second embodiment of the preferred embodiments, one of the prior art triggering conditions for the sender to transmit RESET PDUs to the receiver is amended. That is, the sender is capable of delivering a RESET PDU to the receiver when the sender receives a STATUS PDU carrying an erroneous sequence number only if there is no ongoing reset procedure. In other words, after a reset procedure is triggered, the sender stops receiving any STATUS PDU. This means that any arrived or received STATUS PDU after the reset procedure is initiated and before the reset procedure is terminated will be ignored and discarded. Please refer to FIG. 6, which is a first timing diagram illustrating the reset procedure according to the second embodiment of the present invention. Suppose that the timer Timer_RST is used to count a clocked period equal to 100 ms, and the protocol parameter MaxRST is set to 4. As shown in FIG. 6, the state variable VT(RST) stores the initial value equaling 0 before the reset procedure is activated. In addition, the timer Timer_Status_Periodic is started when the receiver is successfully configured to receiving PDUs. Therefore, the timer Timer_Status_Periodic starts working before the reset procedure is activated. At $t_0$, the receiver detects missing PDUs and outputs a status report to the sender. Suppose that the sender receives this status report and determines that the status report contains an erroneous sequence number at $t_0$. There is no ongoing reset procedure at this moment. Thus, by the second embodiment of this claimed invention, the sender outputs a RESET PDU to the receiver, activates a reset procedure, and waits for the RESET ACK PDU delivered from the receiver. The timer Timer_RST is started to count the clocked period (100 ms). In addition, the state variable VT(RST) is incremented by 1, and stores 1 at $t_0$.

At $t_0+100$, the timer Timer_RST expires and the wanted RESET ACK PDU is not received yet. Therefore, the sender retransmits the RESET PDU to the receiver, and continues waiting for the wanted RESET ACK PDU. The state variable VT(RST) is further increased by 1, and keeps 2 at $t_0+100$. Similarly, the timer Timer_RST will expire at $t_0+200$ when the wanted RESET ACK PDU is still not received yet. Thus, the sender retransmits the RESET PDU to the receiver, and continues waiting for the wanted RESET ACK PDU. The state variable VT(RST) is further increased by 1, and keeps 3 at $t_0+200$.

Suppose that the timer Timer_Status_Periodic expires at T' that is between $t_0+200$ and $t_0+300$. Therefore, the receiver outputs a status report at T' owing to the triggering of the timer Timer_Status_Periodic expiration. The sender receives this status report, which is deemed to contain erroneous sequence number by the sender. However, since there is an ongoing reset procedure at this moment, the sender is blocked from retransmitting the RESET PDU according to the amended triggering condition mentioned above, i.e. the second embodiment of this claimed invention. As shown in FIG. 6, the sender does not respond to the received STATUS PDU at T'. Therefore, the state variable VT(RST) still holds the currently stored value, i.e., 3, and the timer Timer_RST keeps clocking after T'. It is obvious that the timer Timer_RST expires at $t_0+300$, and the RESET PDU is scheduled to be transferred at $t_0+300$. Therefore, the state variable VT(RST) is increased by 1, and stores 4 at $t_0+300$. At this time, the state variable VT(RST) stores a value equaling the protocol parameter MaxRST, and the sender indicates an unrecoverable error to the upper layers to release this radio bearer. Because the protocol parameter MaxRST is set to 4, the sender gives the receiver three chances to receive the RESET PDU and to correspondingly respond a RESET ACK PDU. With the help of the amended triggering condition, the receiver is actually given 3 chances to receive the RESET PDU and 300 ms in total to answer the RESET ACK PDU to the sender. In other words, the interference introduced by the timer Timer_Status_Periodic is cancelled, and the correct functionality of the defined protocol parameter MaxRST is obtained.

Figure 7:
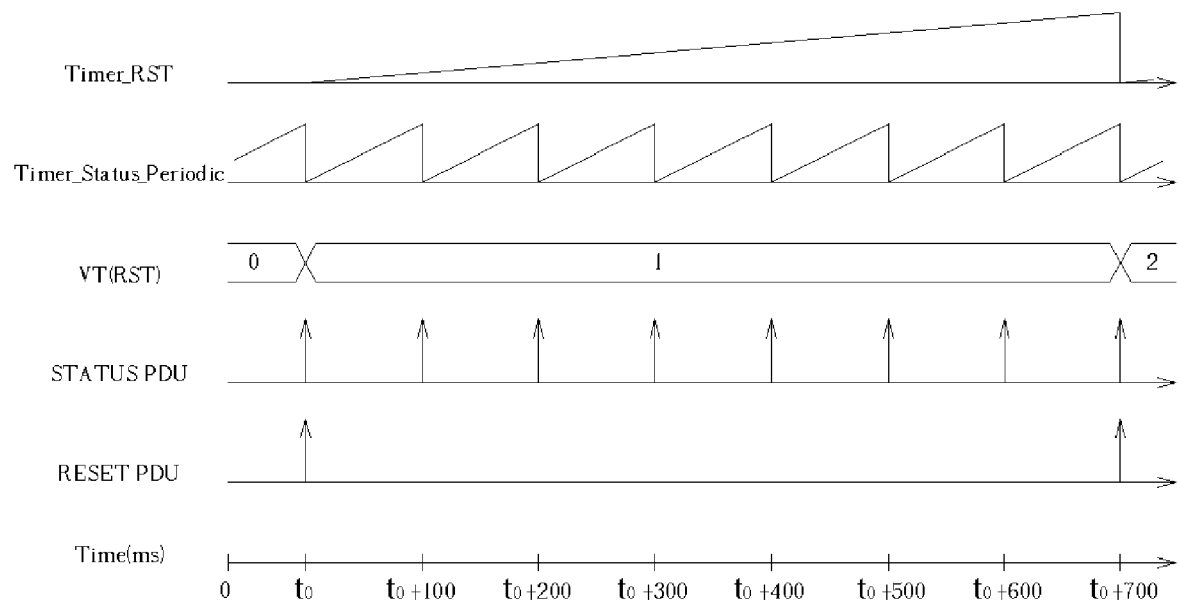
FIG. 7 is a second timing diagram illustrating a reset procedure according to the second embodiment of the present invention.

Please refer to FIG. 7, which is a second timing diagram illustrating the reset procedure according to the second embodiment of the present invention. Suppose that the timer Timer_RST is used to count a clocked period equal to 700 ms, timer Timer_Status_Period is used to count a clocked period equal to 100 ms, and the protocol parameter MaxRST is set to 4. At $t_0$, the timer Timer_Status_Period expires, and the receiver is triggered to output a status report to inform the sender of any missing or received PDUs. Suppose that the sender receives the status report and determines that the status report contains an erroneous sequence number. Therefore, the sender outputs a RESET PDU to the receiver, activates a reset procedure, and waits for the RESET ACK PDU delivered from the receiver. The timer Timer_RST is started to count the clocked period (700 ms), and the state variable VT(RST) is incremented by 1 to store 1. At $t_0+100$, the timer Timer_Status_Period expires, the receiver outputs a status report, which is received and considered as including an erroneous sequence number by the sender. However, the sender is blocked from retransmitting the RESET PDU according to the amended triggering condition mentioned above. The reason is that the reset procedure has been started before $t_0+100$, and the reset procedure is ongoing at $t_0+100$. Please note that by the second embodiment of the present invention, when a reset procedure is ongoing, there is no difference whether the sender receives and interprets the content of the status report or the sender simply ignores the status report. As shown in FIG. 7, the sender does not respond to the received STATUS PDU at $t_0+100$. Therefore, the state variable VT(RST) still holds the currently stored value, and the timer Timer_RST keeps clocking after $t_0+100$. Similarly, the receiver outputs status reports respectively at $t_0+200$, $t_0+300$, $t_0+400$, $t_0+500$, $t_0+600$, and $t_0+700$, and the sender does not respond to these outputted from the receiver. Please note that the timer Timer_RST expires at t+700. Therefore, the sender is successfully triggered to transmit the RESET PDU to the receiver again, and the state variable VT(RST) is increased by 1 to store 2 at $t_0+700$.

According to the above-mentioned operations, when the state variable VT(RST) stores a value equaling the protocol parameter MaxRST, the sender indicates an unrecoverable error to the upper layers, and the radio bearer is accordingly released. Because the protocol parameter MaxRST is set to 4, the sender gives the receiver three chances to receive the RESET PDU and to correspondingly respond a RESET ACK PDU. It is clear that the interference introduced by the timer Timer_Status_Prohibit is cancelled during the ongoing reset procedure. In other words, the protocol parameter MaxRST functions normally to make the sender capable of giving the receiver three chances to receive the RESET PDU.

Figure 8:
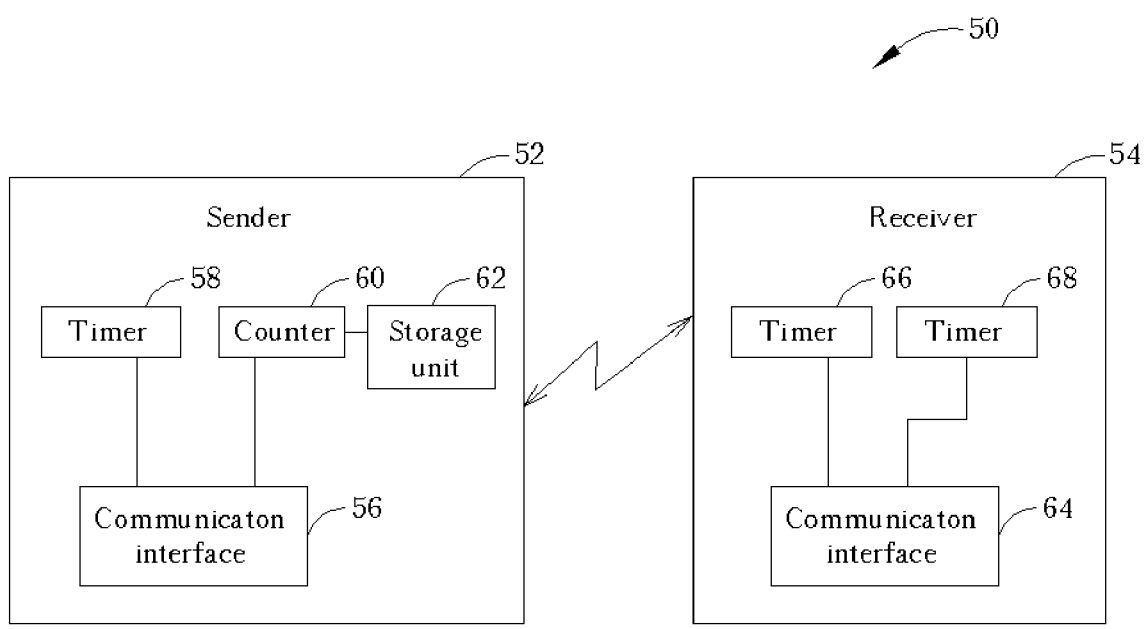
FIG. 8 is a block diagram of a wireless communication system for controlling the reset procedure of the first embodiment according to the present invention.

Please refer to FIG. 8, which is a block diagram of a wireless communication system 50 for controlling the reset procedure of the first embodiment according to the present invention. The wireless communication system 50 includes a sender 52 and a receiver 54. The sender 52 has a communication interface 56, a timer 58 electrically connected to the communication interface 56, a counter 60 electrically connected to the communication interface 56, and a storage unit 62 electrically connected to the counter 60. The receiver 54 has a communication interface 64 and two timers 66 and 68 electrically connected to the communication interface 64. The communication interfaces 56, 64 are used to establish radio links (radio bearers) between the sender 52 and the receiver 54. In this preferred embodiment, the timer 58 stands for the timer Timer_RST, the storage unit 62 is used to store the maximum number of transmissions of a RESET PDU, and the counter 60 is used to count the state variable VT(RST). For the receiver 54, the timer 66 stands for the timer Timer_Status_Periodic, and another timer 68 represents the timer Timer_Status_Prohibit. Therefore, the timer 68 is appropriately set to prevent the state variable VT(RST) from being erroneously counted. Please note that the method of controlling the reset procedure according to the above-mentioned first embodiment has been clearly disclosed. Therefore, the lengthy description of the operations implemented by corresponding device elements is not repeated for simplicity.

Figure 9:
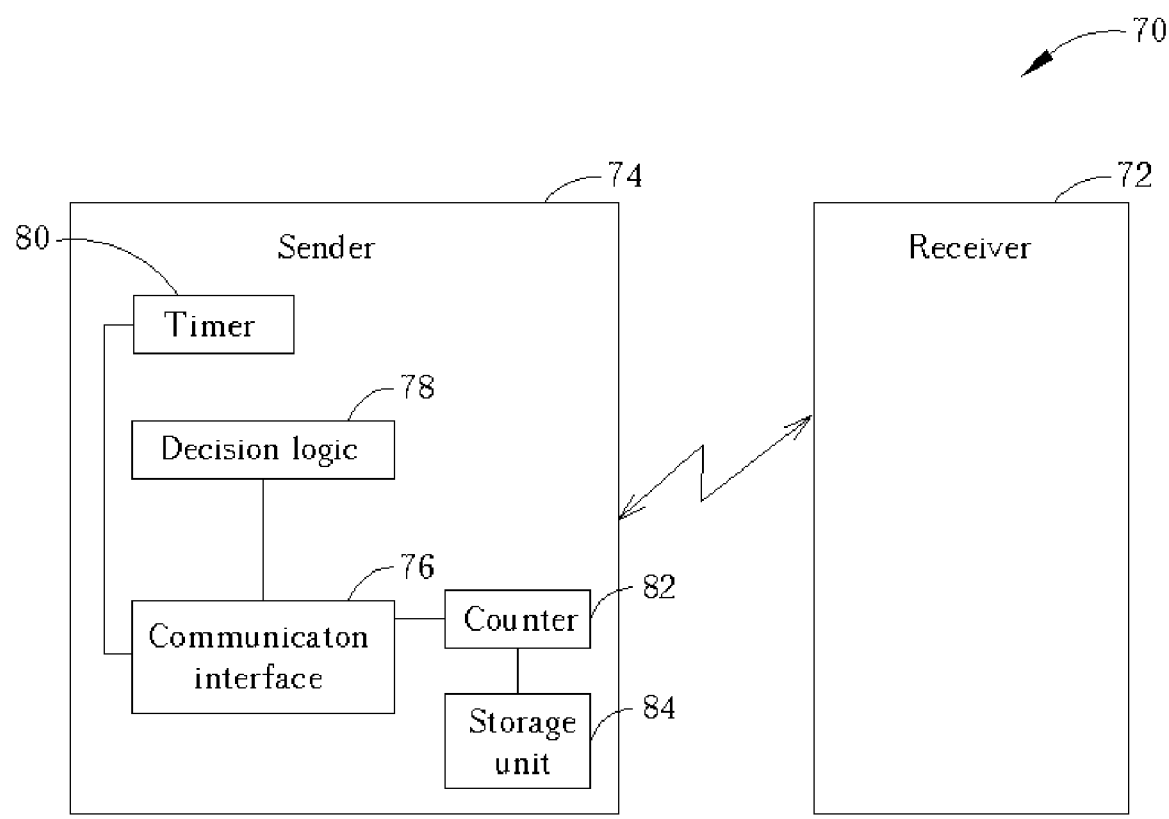
FIG. 9 is a block diagram of a wireless communication system for controlling the reset procedure of the second embodiment according to the present invention.

Please refer to FIG. 9, which is a block diagram of a wireless communication system 70 for controlling the reset procedure of the second embodiment according to the present invention. The wireless communication system 70 has a receiver 72 and a sender 74. Please note that when the receiver 72 outputs data to the sender 74, the originally named sender 74 becomes a "receiver", and the originally named receiver 72 becomes a "sender". That is, the naming of the receiver 72 and the sender 74 depends on the operations of the receiver 72 and the sender 74.

The sender 74 is in wireless communication with the receiver 72, and the sender 74 includes a communication interface 76, a decision logic 78 electrically connected to the communication interface 76, a timer 80 electrically connected to the communication interface 76, a counter 82 electrically connected to the communication interface 76, and a storage unit 84 electrically connected to the counter 82. The communication interface 76 is used to establish radio links (radio bearers) between the sender 74 and the receiver 72. In this preferred embodiment, the timer 80 stands for the timer Timer_RST, the storage unit 84 is used to store the maximum number of transmissions of a RESET PDU, and the counter 82 is used to count the state variable VT(RST). In addition, the decision logic 78 is used to detect if the reset procedure is ongoing for preventing the state variable VT(RST) from being erroneous counted. In other words, with the help of the decision logic 78, the interference introduced by improper blocking of the timer Timer_Status_Periodic by the Timer_Status_Prohibit is cancelled during the ongoing reset procedure. Please note that the method of controlling the reset procedure according to the above-mentioned second embodiment has been clearly disclosed. Therefore, the lengthy description of the operations implemented by corresponding device elements is not repeated for simplicity.

In contrast to the prior art, the claimed method of controlling a reset procedure sets a proper clocked period to the timer Timer_Status_Prohibit for blocking the timer Timer_Status_Period from interfering with the counting of the state variable VT(RST). In addition, the claimed method of controlling a reset procedure makes use of an amended triggering condition. Therefore, the sender ignores the STATUS PDUs having erroneous sequence numbers during the ongoing reset procedure. To sum up, the state variable VT(RST) is not increased prematurely, and the reset procedure behaves correctly according to the configured protocol parameter MaxRST.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of controlling a reset procedure for a radio communication link between a sender and a receiver comprising the steps of:
    (a) the receiver transmitting at least a receiving status report to the sender;
    (b) the sender receiving at least a first receiving status report sent from the receiver, determining that the receiving status report contains protocol error, activating a reset procedure, and transmitting a RESET PDU to the receiver; and
    (c) recognizing the reset procedure as ongoing before the sender receives a RESET ACK PDU outputted from the receiver, and controlling the sender to ignore at least a second receiving status report outputted from the receiver when the sender has not received a RESET ACK PDU from the receiver and the reset procedure is ongoing, wherein the second receiving status report is received later than the first receiving status report.

2. The method of claim 1 wherein step (b) further comprises utilizing the sender to periodically output a RESET PDU to the receiver according to a predetermined period of time before the number of transmissions of the RESET PDUs reaches a predetermined value and before the sender receives the RESET ACK PDU outputted from the receiver.

3. The method of claim 2 wherein step (b) further comprises utilizing the sender to start a timer for clocking the predetermined period of time when the sender outputs a RESET PDU.

4. The method of claim 3 wherein the timer is a timer $Timer_{13}$ RST according to a 3GPP specification.

5. A sender in wireless communication with a receiver for receiving at least a first receiving status report sent from the receiver, the sender comprising:
    a communication interface for activating a reset procedure and transmitting a RESET PDU to the receiver when determining that the first receiving status report contains protocol error; and
    a decision logic electrically connected to the communication interface for recognizing the reset procedure as ongoing before the communication interface receives a RESET ACK PDU outputted from the receiver;

wherein the decision logic controls the communication interface to ignore at least a second receiving status report outputted from the receiver when the sender has not received a RESET ACK PDU from the receiver and the reset procedure is ongoing; wherein the second receiving status report is received later than the first receiving status report.

6. The sender of claim 5 periodically outputting a RESET PDU to the receiver according to a predetermined period of time before the number of transmissions of the RESET PDUs reaches a predetermined value.

7. The sender of claim 6 further comprising a timer electrically connected to the communication interface for clocking the predetermined period of time, wherein the communication interface starts the timer when outputting a RESET PDU.

8. The sender of claim 7 wherein the timer is a timer $Timer_{13}$ RST according to a 3GPP specification.

* * * * *